United States Patent [19]

Hour

[11] Patent Number: 4,981,268
[45] Date of Patent: Jan. 1, 1991

[54] AUTOMATIC WASHING AND STERILIZING DEVICE FOR A STABLE

[76] Inventor: Tyh-Yuan Hour, 82, To-Syn Village, Luh-Jeau Shian, Chiayi Hsien, Taiwan

[21] Appl. No.: 458,366

[22] Filed: Dec. 28, 1989

[51] Int. Cl.$^5$ ............................................. B08B 3/02
[52] U.S. Cl. .................................... 239/752; 134/181; 239/264
[58] Field of Search ...................... 239/751, 752, 263.1, 239/263.3, 264, 265; 134/172, 180, 181

[56] References Cited

U.S. PATENT DOCUMENTS

| | | | |
|---|---|---|---|
| 3,908,907 | 9/1975 | Beltran | 239/752 |
| 3,985,161 | 10/1976 | Nelson | 239/751 |
| 4,805,648 | 2/1989 | Hour | 134/57 R |

FOREIGN PATENT DOCUMENTS

| | | | |
|---|---|---|---|
| 15086 | of 1903 | United Kingdom | 239/752 |
| 2181031 | 4/1987 | United Kingdom | 239/751 |

Primary Examiner—Philip R. Coe
Attorney, Agent, or Firm—Larson & Taylor

[57] ABSTRACT

An automatic washing and sterilizing device for a stable comprising a crane moving on wire ropes, and a spray system mounted on the crane for spraying water for washing or sterilizing solution for sterilization all over in a stable.

2 Claims, 5 Drawing Sheets

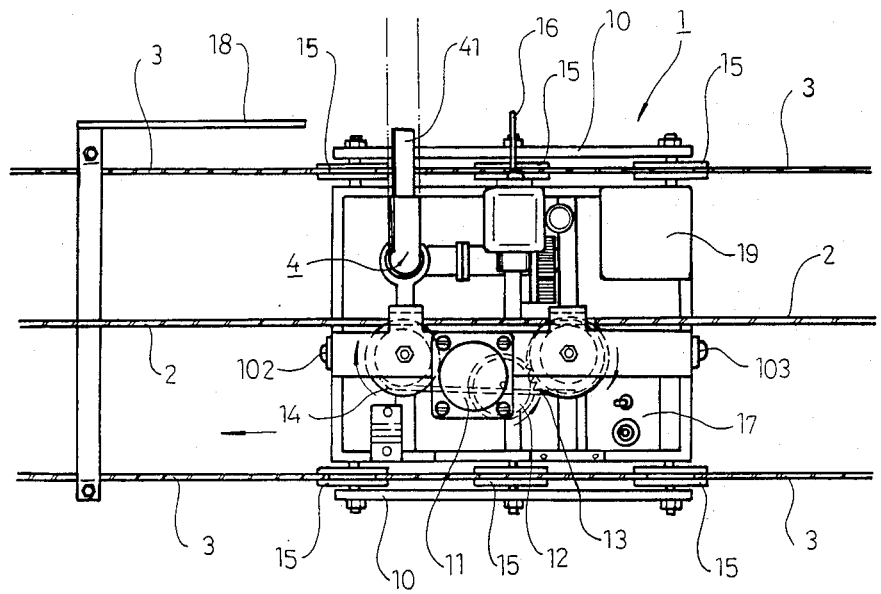
FIG. 1
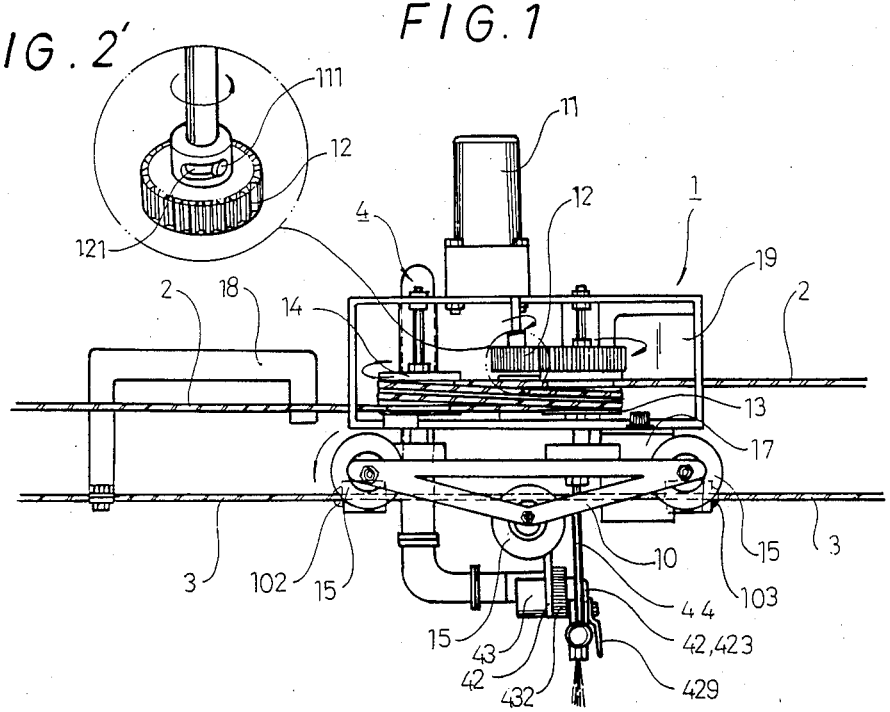
FIG. 2'
FIG. 2

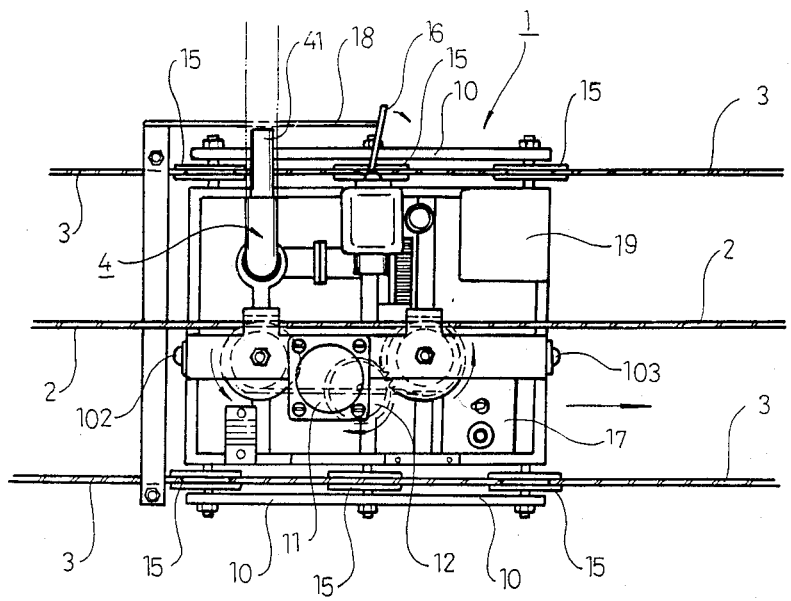
FIG. 3
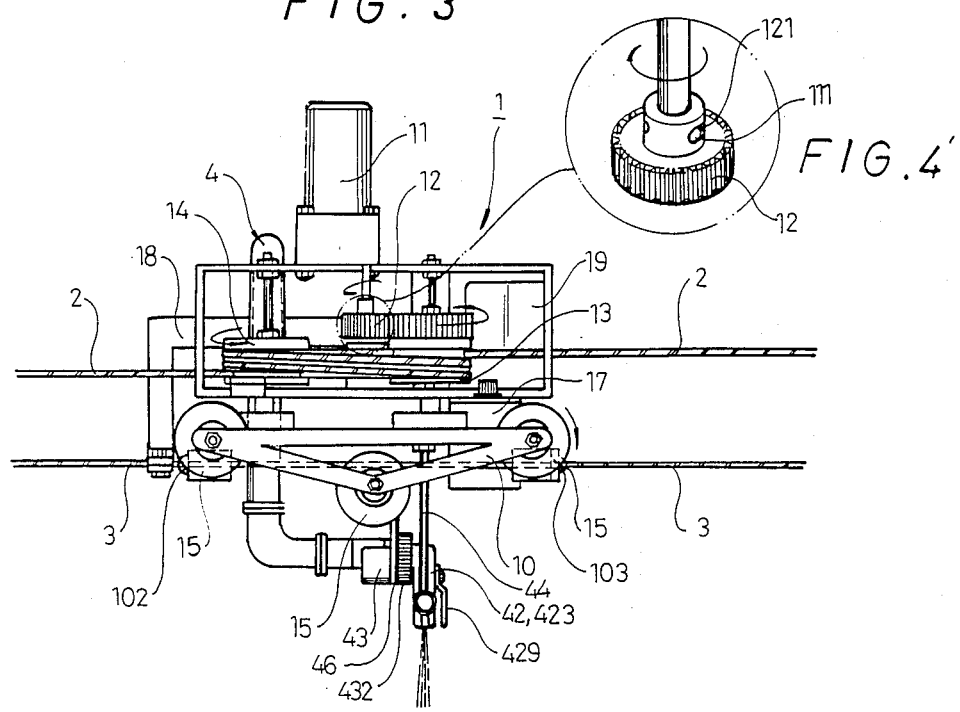
FIG. 4'
FIG. 4

4,981,268

AUTOMATIC WASHING AND STERILIZING DEVICE FOR A STABLE

BACKGROUND OF THE INVENTION

The U.S. Pat. No. 4,805,648 titled "Automatic washing and sterilizing device for a stable" has a structure wherein two cranes provided with a spraying system are to be moved by ropes pulled and wound by wind drive wheels driven by a speed transmission system connected with motors. The nozzles are connected with pipes and valves to shoot or spray water or sterilizing solution selectively. The moving direction of the cranes is altered by two location switches having a control bar to be touched by the plates of the cranes. The structure is rather complicated, and besides, the spraying angle and scope is limited, and unable to freely adjust because of the nozzles 34 are controlled by a synchronous motor 27.

SUMMARY OF THE INVENTION

The object of this invention is to provide an improved structure of the above-mentioned patent, simplifying its structure by using one crane instead of two and enabling the spraying scope to be adjusted more freely.

The automatic washing and sterilizing device for a stable according to the present invention comprises a crane and a spray system as its main components.

The crane includes a motor to rotate two wind drive wheels to wind a wire rope to move the crane, and two guide pulley sets to guide the crane to move right and left on two wire ropes stretched between both sides in a stable.

The motor is combined with a timer which controls the working time of the motor. The crane is provided with an electric switch, which can reverse the moving direction of the crane when it goes to touch a limit rod respectively fixed at both end sections of the two guide wire ropes.

The two guide wire ropes are located at both sides of the wire rope on the wind drive wheels, parallel to one another. Each of the two guide pulley sets includes three pulleys fixed at the three corners of a triangular frame so that two pulleys, the right and the left, resting on said guide wire and one pulley, the middle, supporting said guide wire, move along said wire.

The spray system includes a nozzle combined with two elbow fittings linked together. One of said elbows has a gear wheel to engage with another gear wheel fixed on the shaft of a motor so that the motor can rotate to make the nozzle sway in an angle. And its sway angle is adjusted and limited by positioning threaded rods so that the spray scope can be adjusted.

BRIEF DESCRIPTION OF THE DRAWINGS

This invention will now be described in detail with reference to accompanying drawings wherein:

FIG. 1 is a front view of the automatic washing and sterilizing device depicted in FIG. 1 for a stable in accordance with the present invention;

FIG. 2 is a bottom view of the automatic washing and sterilizing device depicted in FIG. 1 or a stable in accordance with the present invention;

FIG. 2' is a perspective view of the circled gear wheel depicted in FIG. 2;

FIG. 3 is a front view of the automatic washing and sterilizing device for a stable positioned at the most left point;

FIG. 4 is a bottom view of the automatic washing and sterilizing device depicted in FIG. 3 for a stable in accordance with the present invention;

FIG. 4' is a perspective view of the circled gear wheel depicted in FIG. 4; and

DETAILED DESCRIPTION OF THE INVENTION

Figure 5:
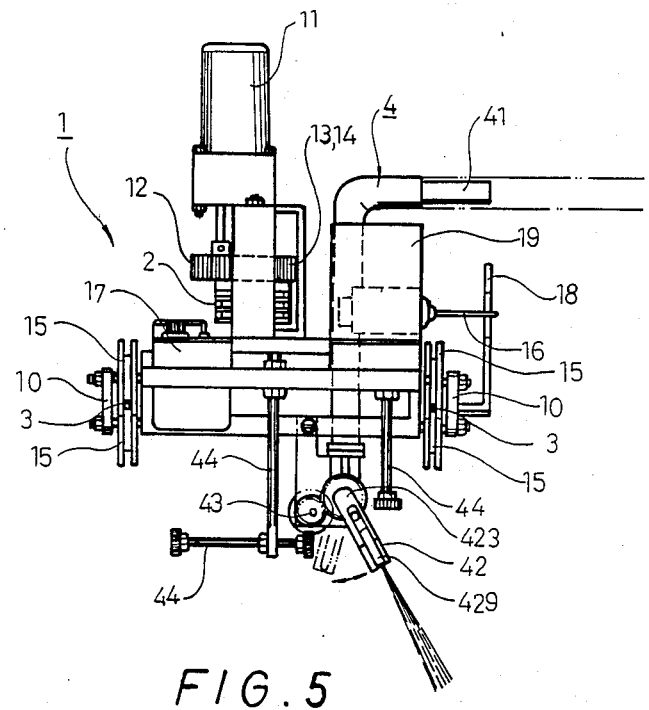
FIG. 5 is a right-side view of the automatic washing and sterilizing device for a stable in accordance with the present invention.
Figure 6:
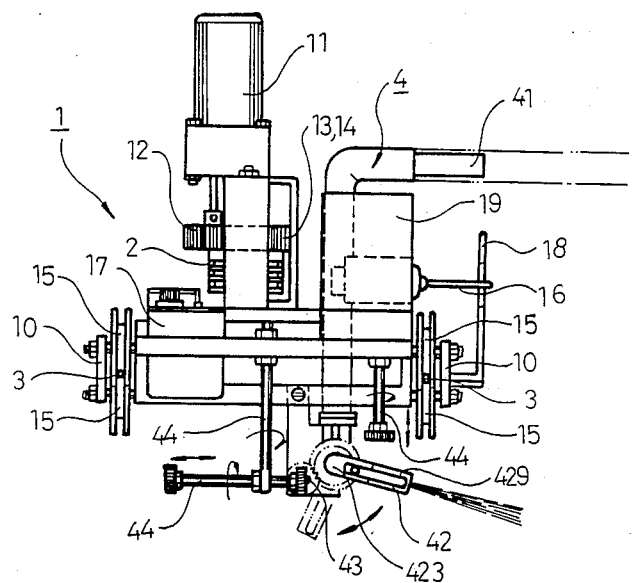
FIG. 6 is a right-side view of the automatic washing and sterilizing device similar to FIG. 5 but with an adjusted larger spraying angle.

At first, referring to FIGS. 1 and 2, this device comprises a crane 1 including a motor 11 to turn a wind drive wheel 13 via a gear wheel 12. A wire rope 2 is wound around the wind drive wheel 13 and another wind drive wheel 14. Both ends of the rope 2 are securely and respectively fixed at both sides in a stable such that the crane 1 can move along two guide ropes 3 right and left with help of two guide pulley sets 15, pulled by the rope 2 when the motor 11 is in motion.

The shaft of the motor 11 is provided with a sidewise pin 111 to fit in a slot 121 in the cylindrical shaft-linking section of the gear wheel 12 so that the gear wheel 12 can stop a bit when the clockwise revolution of the motor 11 is changed to the counter-clockwise revolution after the gear wheel 12 is assembled with the motor 11. Thereby the motor 11 can have a slight delay in its reversing action as to lessen its burden and thereby to decrease its breaking percentage.

The drive wire rope 2 and the guide wire ropes 3 are securely stretched parallel to one another between two lengthwise sides in a stable, with both ends thereof fixed at said both sides. The rope 2 is set between the two ropes 3, wound around both the wind drive wheels 13 and 14. The guide pulley sets 15 respectively include three pulleys fitted on the three corners of a triangular frame 10, and two pulleys, the right and the left, rest on the rope 3 and the middle one touches just under the rope 3 such that the rope 3 is located between the guide pulley set 15 to allow said set 15 to move along on the rope 3.

The motor 11 is connected with a timer 17, which controls the working time of the motor 11. The crane 1 is provided with an electric switch 16 for touching a limit rod 18 fixed securely at both end sections of the rope 3 selectably with a bolt. The moving distance of the crane 1 can be limited by the position of the limit rods 18.

When the switch 16 comes to touch the limit rod 18 as shown in FIG. 3, the switch 16 makes the motor 11 to turn reversely with control of a relay 19 so that the crane 1 moves in the reverse direction towards the other side of the stable until the timer 17 stops. To prevent breaking of the switch 16, two push buttons 102 and 103 are respectively provided at both sides of the crane 1, for cutting off the power source of the motor 11 when said buttons 102 and 103 are pressed down or come to be pressed down by a sidewise rod at the bottom of the limit rod 18. Therefore, the crane can avoid continuing to move on. Besides, manual pressing of said buttons 102 and 103 can stop the crane temporarily at a position where additional washing is desired. As to the motor, the timer, the relay and the push buttons, they are well-known arts, not to be described here.

Next, referring to FIGS. 1, 2, 5 and 6, the spray system 4 is mounted on the crane 1. Spray system 4 comprises a guide tube 41 for guiding in water or sterilizing solution sucked in by a pump to be sprayed or shot out of a nozzle 42, which can be swayed within a pre-set angle by a motor 43. The swaying angle of the nozzle 42 is controlled by positioning threaded rods 44, whose turning alters the distance between said rods and the nozzle 42. In other words, the touching location of the nozzle 42 with the right ends of the positioning rods 44 is changed so that the spraying scope or angle of said nozzle may be adjusted properly.

Figure 7:
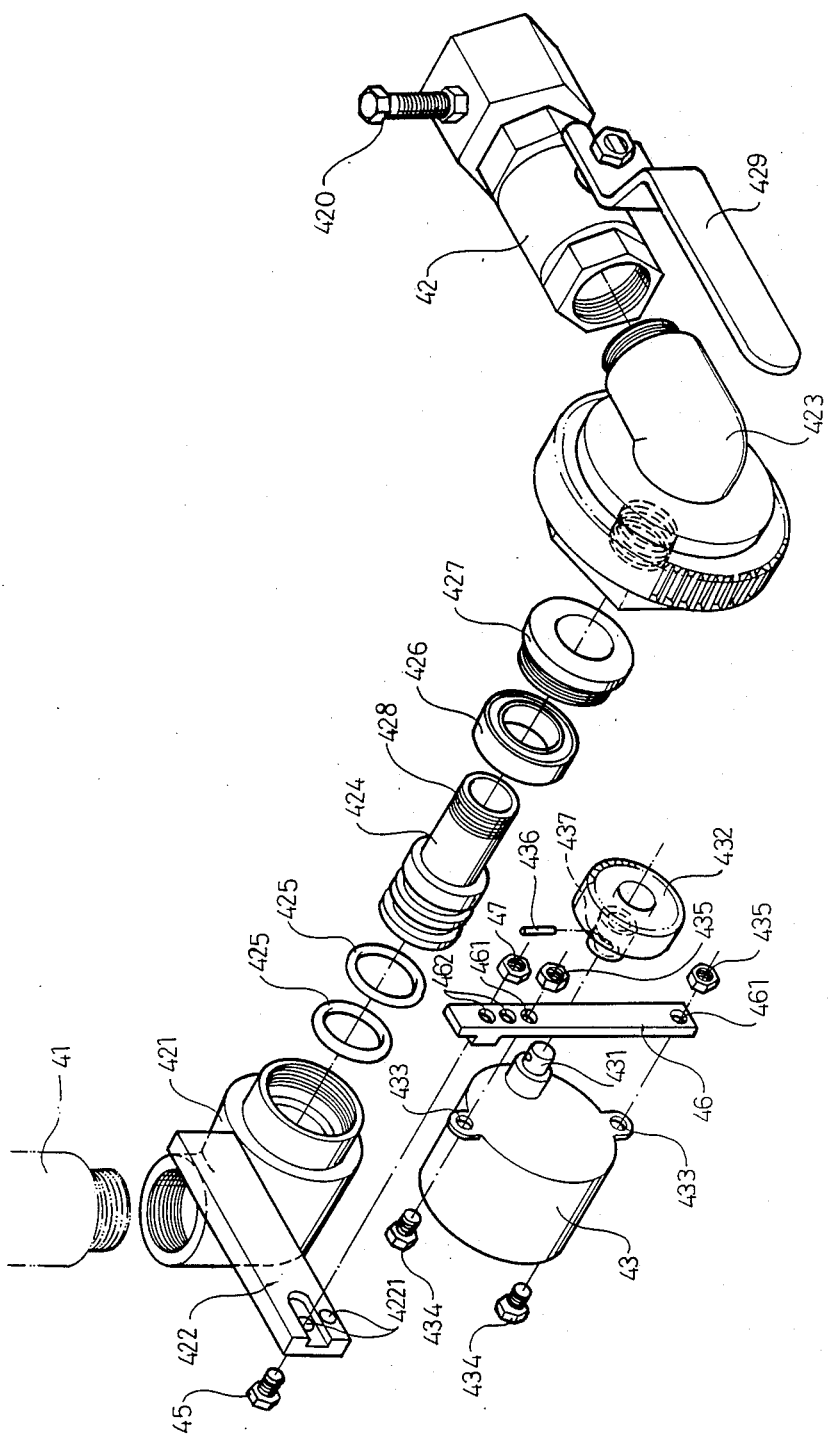
FIG. 7 is an exploded perspective view of the nozzle in accordance with the present invention.

Referring to FIG. 7, the nozzle 42 is indirectly linked with an elbow fitting 421 which is screwed with the guide tube 41. To a sidewise plate 422 is mounted a motor 43 having a shaft 431 to combine with a driving gear wheel 432. The shaft 431 is provided with a hole for a pin 436 to be inserted therein, and the gear wheel 432 is provided with a slot 437 in its cylindrical combining section. Thus, the pin 436 can protrude out of the slot 437 and thereby stick at one end of the slot 437 to rotate the gear wheel 432 after the shaft 431 and the gear wheel 432 are assembled together. In addition, the slot 437 affords the gear wheel 432 an idle space in reversing rotation of the motor 43, which is convenient to start the motor 43. The gear wheel 432 engages with the gear wheel in the elbow fitting 423, which is combined with the elbow fitting 421. In order to enable the elbow fitting 423 to rotate and liquid to flow to the nozzle 42, a hollow inner post 424 is provided to be contained in the elbow fitting 421. Inner post 24 has two circumferential grooves at one end for two anti-leak gaskets 425 to stick in so that said inner post 424 can rotate in the elbow fitting 421. A bearing 426 is placed around the inner post 424 and then contained in the elbow fitting 421. A seal cap 427 having a male thread screws with a female thread at one end of the elbow fitting 421 so as to confine a large part of the inner post 424 in said elbow 421.

Figure 8:
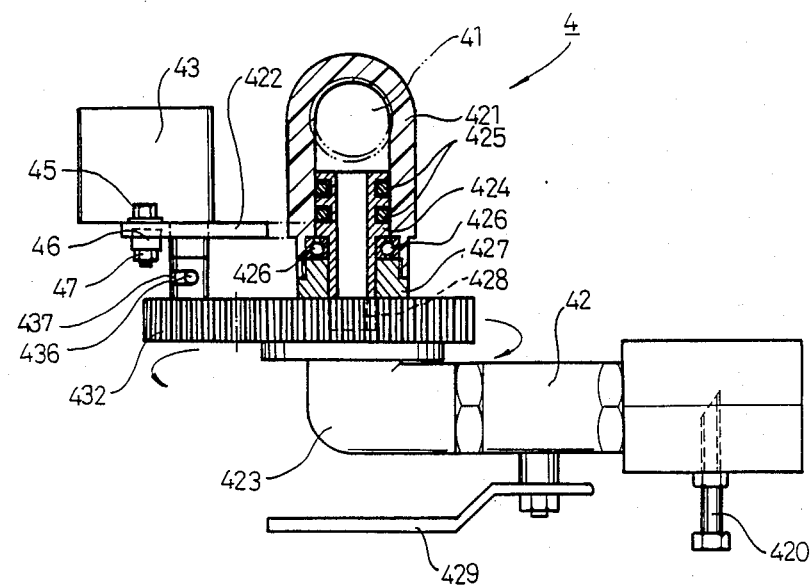
FIG. 8 is a bottom view of the nozzle in accordance with the present invention.
Figure 9:
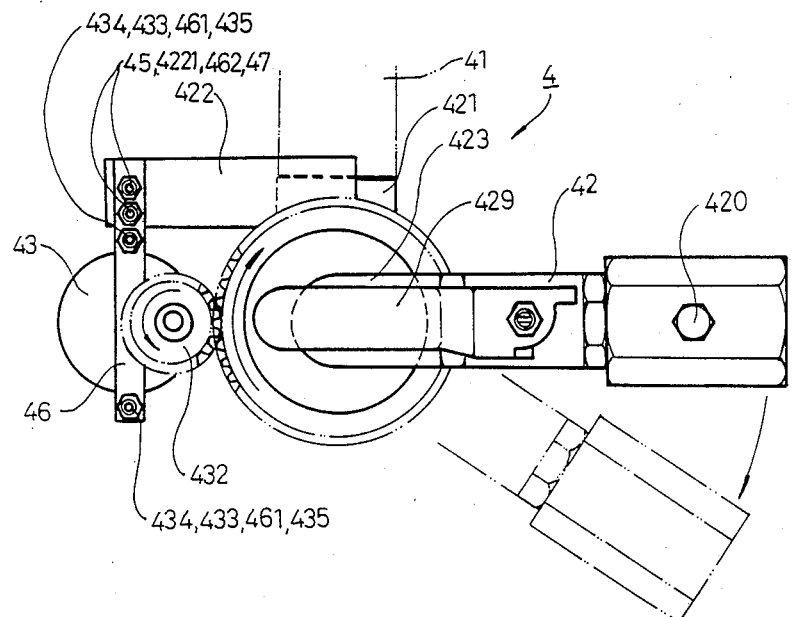
FIG. 9 is a front view of the nozzle in accordance with the present invention.

The inner post 424 is also provided with a male thread 428 at the right end to penetrate through the central hole in the sealed cap and to screw with a female thread in the elbow fitting 423 so that the rotation of the elbow fitting 423 enables the inner post 424 to rotate idly in the elbow fitting 421 and the bearing 426. Then, the elbow fitting 423 is assembled with the nozzle 42 as shown in FIG. 8, so that the fluid can flow orderly through the elbow 421, the inner post 424, the elbow 423 and out of the nozzle 42. Thus, the fluid can be shot or sprayed in proper volume, with help of a handle 429 and bolt 420.

The motor 43 is fixed on a positioning plate 46 with two bolts 434 and nuts 435 penetrating two ear holes 433 and two holes 461. The positioning plate 46 is also provided with two holes 462 for a bolt 45 to penetrate to screw with a nut 47 for screwing the motor 43 with the sidewise plate 422 so that the gear wheel 432 can engage steadily with the gear wheel in the elbow 423.

What is claimed is:

1. An automatic washing and sterilizing system for a stable comprising:
   a drive wire rope and two guide wire ropes positioned parallel to one another with said wire rope between said two guide wire ropes, respective ends of all of said wire ropes being fixed securely at opposite sides of the stable;
   a respective limit rod provided at each side of the stable adjacent one of said guide wire ropes;
   a crane including
   (a) two guide pulley sets, each said pulley set receiving an associated said guide wire rope therethrough such that said crane is movably mounted on said two guide wire ropes,
   (b) two drive wheels about which are wound portions of said drive wire rope whereby rotation of one said drive wheel causes said crane to move along said wire ropes,
   (c) a drive motor and associated gear wheel transmission means for rotating one of said drive wheels,
   (d) a timer for controlling an actuation time of said drive motor,
   (e) an electric switch positioned to engage said limit rod at each side of the stable whereby engagement of said electric switch reverses said motor and hence and direction of movement of said crane along said wire ropes; and
   a spray system mounted on said crane including
   (a) a nozzle,
   (b) an elbow fitting to which said nozzle is attached, said elbow fitting including a gear wheel thereabout,
   (c) a second motor and associated drive shaft on which said drive shaft a drive gear wheel is mounted for engagement with said gear wheel such that rotation of said drive shaft causes said nozzle to sway about a preset angle, and
   (d) an adjusting means for adjusting the sway angle of said nozzle, said adjusting means including a respective threaded rod located movably on respective sides of said nozzle which limit the sway angle of said nozzle on the associated side by engagement therewith.

2. An automatic washing and sterilizing system as claimed in claim 1 wherein said adjusting means includes a connecting means for connecting said drive shaft to said drive gear wheel, said connecting means including a pin protruding from said drive shaft and a slot provided in said drive gear wheel in which said pin is received whereby rotation of said drive shaft results in rotation of said drive gear wheel only when said pin is rotated into engagement with a respective end of said slot.

* * * * *